(12) United States Patent
Swanson

(10) Patent No.: US 10,393,216 B2
(45) Date of Patent: Aug. 27, 2019

(54) REDUNDANT ACTIVE VIBRATION AND NOISE CONTROL SYSTEMS AND METHODS

(71) Applicant: LORD Corporation, Cary, NC (US)

(72) Inventor: Douglas A. Swanson, Cary, NC (US)

(73) Assignee: LORD Corporation, Cary, NC (US)

( * ) Notice: Subject to any disclaimer, the term of this patent is extended or adjusted under 35 U.S.C. 154(b) by 352 days.

(21) Appl. No.: 15/303,632

(22) PCT Filed: Dec. 12, 2014

(86) PCT No.: PCT/US2014/070034
§ 371 (c)(1),
(2) Date: Oct. 12, 2016

(87) PCT Pub. No.: WO2015/089404
PCT Pub. Date: Jun. 18, 2015

(65) Prior Publication Data
US 2017/0067530 A1    Mar. 9, 2017

Related U.S. Application Data

(60) Provisional application No. 61/915,698, filed on Dec. 13, 2013.

(51) Int. Cl.
*B06B 1/16* (2006.01)
*F16F 15/00* (2006.01)
(Continued)

(52) U.S. Cl.
CPC .............. *F16F 15/002* (2013.01); *B06B 1/16* (2013.01); *B64C 27/001* (2013.01); *G05B 15/02* (2013.01); *B64C 2027/004* (2013.01)

(58) Field of Classification Search
CPC ... B06B 1/16; B64C 2027/004; B64C 27/001; F16F 15/002; G05B 15/02
See application file for complete search history.

(56) References Cited

U.S. PATENT DOCUMENTS 5,219,143 A   6/1993 Staple et al.
5,294,757 A   3/1994 Skalski et al.
(Continued)

FOREIGN PATENT DOCUMENTS

DE   10 2008 022895   11/2009
EP   2 765 051        8/2013
(Continued)

OTHER PUBLICATIONS

Schlegel, M. et al, Active vibration control of two-mas flexible system using parametric Jordan form assignment, IFAC Conference on Advances in PID Control, PID'12, Brescia (Italy), Mar. 28-30, 2012, 6 pgs.

*Primary Examiner* — Kenneth M Lo
*Assistant Examiner* — Michael J Huntley
(74) *Attorney, Agent, or Firm* — Richard G. Miller

(57) ABSTRACT

Redundant active vibration and noise control systems and methods are provided, which include safety-critical systems and methods. In one embodiment, a safety-critical active vibration control system (SCAVCS) is provided, which includes a plurality of digital buses, a force generator, at least one sensor and at least one system parameter. The at least one force generator is in electronic communication with at least two digital buses. The force generator includes a pair of unbalanced masses, at least one motor, at least one microprocessor, at least one speed sensor, at least one accelerometer, and at least one power input. The at least one sensor is in electronic communication with each of the digital buses and with each of the microprocessors. The at least one system parameter is in electronic communication with each of the digital buses and each of the microprocessors.

17 Claims, 4 Drawing Sheets

(51) Int. Cl.
*G05B 15/02* (2006.01)
*B64C 27/00* (2006.01)

(56) References Cited

U.S. PATENT DOCUMENTS

| | | | |
|---|---|---|---|
| 6,484,080 B2 | 11/2002 | Breed | |
| 6,974,006 B2 | 12/2005 | Ruckman et al. | |
| 7,017,857 B2 | 3/2006 | Hill et al. | |
| 7,197,147 B2 | 3/2007 | Millott et al. | |
| 7,448,854 B2 | 11/2008 | Jolly et al. | |
| 7,877,627 B1* | 1/2011 | Freydel | G06F 11/182 |
| | | | 714/11 |
| 7,958,801 B2 | 6/2011 | Federickson | |
| 8,162,606 B2 | 4/2012 | Jolly et al. | |
| 8,445,837 B2 | 5/2013 | Matsukawa et al. | |
| 8,558,498 B2 | 10/2013 | Takahashi et al. | |
| 8,639,399 B2 | 1/2014 | Jolly et al. | |
| 8,659,245 B2 | 2/2014 | Kobayashi et al. | |
| 8,760,039 B2 | 6/2014 | Schiller et al. | |
| 2003/0212498 A1* | 11/2003 | Kramb | G01H 1/003 |
| | | | 702/33 |
| 2004/0050999 A1* | 3/2004 | Hill | G05D 19/02 |
| | | | 244/17.27 |
| 2007/0156289 A1* | 7/2007 | Altieri | G01M 1/22 |
| | | | 700/280 |
| 2010/0034655 A1* | 2/2010 | Jolly | B64C 27/001 |
| | | | 416/145 |
| 2010/0038473 A1* | 2/2010 | Schneider | B64D 27/24 |
| | | | 244/60 |
| 2010/0131114 A1 | 5/2010 | Stothers et al. | |
| 2010/0219634 A1* | 9/2010 | Arlaban Gabeiras | |
| | | | F03D 7/0284 |
| | | | 290/44 |
| 2011/0208361 A1 | 8/2011 | Hildebrand et al. | |
| 2012/0012732 A1* | 1/2012 | Zameroski | B64C 27/26 |
| | | | 248/638 |
| 2012/0103731 A1 | 5/2012 | Sakuma | |
| 2012/0158217 A1 | 6/2012 | Jolly et al. | |
| 2012/0247888 A1 | 10/2012 | Chikuma et al. | |
| 2013/0197722 A1* | 8/2013 | Lin | B64C 13/503 |
| | | | 701/3 |

FOREIGN PATENT DOCUMENTS

| | | |
|---|---|---|
| WO | 2013137295 | 9/2013 |
| WO | 2014075030 | 5/2014 |
| WO | 2014113666 | 7/2014 |

* cited by examiner

REDUNDANT ACTIVE VIBRATION AND NOISE CONTROL SYSTEMS AND METHODS

CROSS REFERENCE TO RELATED APPLICATION

This application relates to and claims priority to U.S. Provisional Patent Application Ser. No. 61/915,698, filed Dec. 13, 2013, the disclosure of which is incorporated by reference herein in the entirety.

TECHNICAL FIELD

The subject matter herein generally relates to the field of active vibration and noise control systems and methods. The subject matter herein more particularly relates to redundant active vibration and noise control systems and methods.

BACKGROUND

In some embodiments, vibration and noise control systems utilize force generators (FGs) to actively eliminate or reduce the effect and impact of unwanted vibratory disturbances on a system. Vibration disturbances can wreak havoc on systems by reducing the life expectancy of the systems, structurally damaging the systems, and/or reducing the overall system performance. These impacts create potentially unsafe conditions when the systems are used.

Implementing active vibration and noise control (e.g., via FGs) is increasing and often preferred over implementing passive vibration control (e.g., via passive dampers or absorbers), in some aspects, to reduce the overall system weight. Some active vibration control systems (AVCS) are also an increased safety risk for some systems, as some AVCS are safety-critical systems. Safety-critical systems are those systems whose failure could result in loss of life, property, and/or damage to the environment. AVCS become safety-critical, for example, when the vibrations being cancelled have the ability to critically impact operations or by putting life or property at risk should a failure of the AVCS, or portions thereof, occur.

One non-limiting example of an AVCS that is a safety-critical system is in the aviation field, where active vibration control is used to mitigate vibrations having damaging effects on different systems (e.g., rotor(s), propeller(s), stator (s), engine(s), gearbox(es), etc.) and/or avionics. Other negative impacts from vibration in the aviation field include damage inflicted to human occupants and/or cargo. Other exemplary systems that may be negatively impacted by exposure to vibration forces include industrial equipment and manufacturing structures, buildings, vehicles (e.g., automobiles, avionics, aerospace), transportation, maritime structures, and/or any other structure or system subjected to an unwanted or potentially damaging vibratory input. The negative impacts can vary per situation.

One problem with current AVCSs is the inability to adequately detect system problems (e.g., failures or faults) and actively and/or autonomously adjust appropriately to handle failure modes for safety-critical systems. For example, one safety-critical system in the aerospace field impacts aerospace certification due to loss of function and/or an erroneous function. In this example, loss of function refers to an AVCS failure where it stops providing vibration control. In this same example, erroneous function refers to failure modes where the force output of the FGs is not a desired output or the FG erroneously induces vibration that is not wanted. Other examples include hydroelectric turbines, fast spinning industrial equipment, propulsion systems, and/or any other system or structure where the failure of a vibration control system has a damaging or catastrophic effect. Further problems with current AVCS include a lack of redundancy while minimizing weight and space penalties on the systems being controlled.

Accordingly, there is a need for lighter weight AVCS and methods that are redundant, safety-critical, and configured to implement autonomous vibration control.

SUMMARY

A safety-critical active vibration control system (SCAVCS) is provided having redundancy and autonomy. In one aspect the SCAVCS has redundant and autonomous control. In another aspect the SCAVCS has multiple sensor input. In yet another aspect, the SCAVCS has redundant sensor input along with redundant and autonomous control. In still another aspect, the SCAVCS provides monitoring of the system that it is controlling and provides for redundant sensor input along with redundant and autonomous control.

In one embodiment, a safety-critical active vibration control system (SCAVCS) is provided. The SCAVCS includes a plurality of digital buses, a force generator, at least one sensor and at least one system parameter. The at least one force generator is in electronic communication with at least two digital buses. The force generator includes a pair of unbalanced masses, at least one motor, at least one microprocessor, at least one speed sensor, at least one accelerometer, and at least one power input. The at least one sensor is in electronic communication with each of the digital buses and with each of the microprocessors. The at least one system parameter is in electronic communication with each of the digital buses and each of the microprocessors.

Numerous objects and advantages of the subject matter will become apparent as the following detailed description of the preferred embodiments is read in conjunction with the drawings, which illustrate such embodiments.

DETAILED DESCRIPTION

Figures (also "FIGS.") 1 to 4 illustrate various views and/or features associated with AVCS and related methods for controlling vibration of and/or operability to reduce noise and vibration within various structures, vehicles, aircraft, helicopters, machinery, equipment, buildings, bridges, etc., which experience vibration during operation. In some aspects, safety-critical AVCS or "SCAVCS" and methods are provided herein, for implementing redundant, autonomous vibration control.

As used herein, the terms "microprocessor" and "controller" each refer to physical devices including hardware in combination with software and/or firmware. A controller includes at least one hardware processor, at least one memory element, at least one input interface, and at least one output interface for sending and receiving signals (e.g., from sensors or inputs) between components of a system, such as sensors and rotary actuators (e.g., force generators (FGs), such as circular force generators (CFGs)). A microprocessor is configured to execute instructions stored within a memory element thereof for implementing vibration control by instructing one or more FGs (e.g., via force commands or force command control signals).

Figure 1:
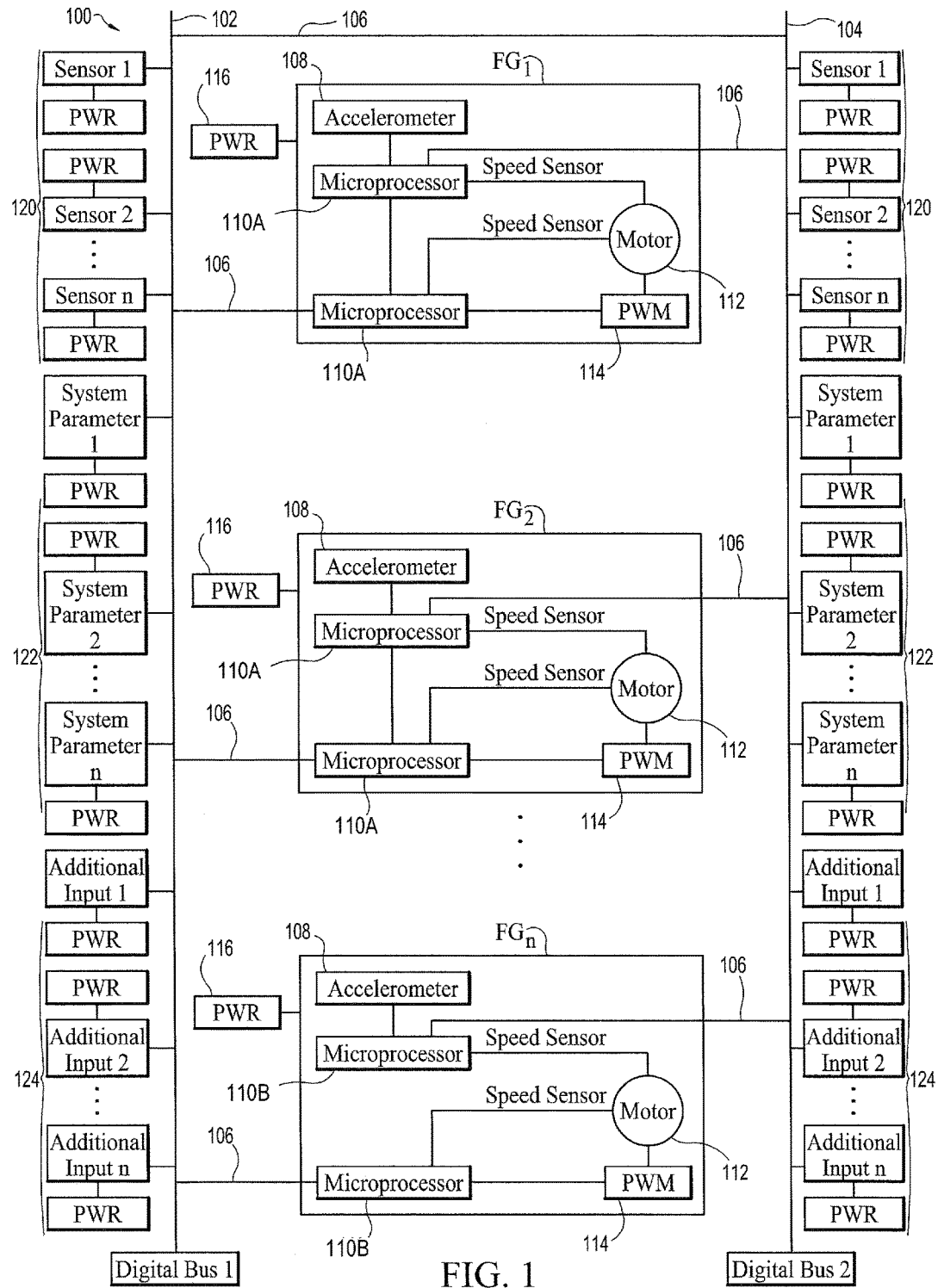
FIG. 1 is a schematic illustration of one embodiment of a redundant active vibration control system (AVCS) for controlling noise and vibration of a structure.

Referring now to FIG. 1, a first embodiment of an Active Vibration Control System (AVCS), generally designated 100, is illustrated. System 100 is configured to actively detect vibrations occurring on, within, and/or to a structure and implement vibration control, in part, upon generation of vibration cancelling forces via one or more rotary actuators or FGs. Various structures and/or systems are subjected to vibrating forces, and may therefore benefit from use or incorporation of system 100, for example, structures and/or systems include, and are not limited to, industrial equipment structures and/or systems; industrial machinery structures and/or systems; building structures and/or systems; fuselage structure(s); engine structures and/or systems; jet engine aircraft structures and/or systems; turboprop aircraft structures and/or systems; tiltrotor aircraft structures and/or systems; helicopter structures and/or systems; ship structures and/or systems; hovercraft structures and/or systems; semi-truck structures and/or systems; train structures and/or systems; and/or any other vehicle structures and/or systems.

System 100 includes a plurality of FGs, designated $FG_1$, $FG_2$, $FG_n$ (where "n" is a whole number integer>2) digitally linked between a plurality of communication lines. $FG_1$ to $FG_n$ are each configured to generate and/or impart vibration (s) to a structure, or portions thereof, for countering and/or cancelling the vibration force(s) that negatively affect the structure. System 100 includes a plurality of digital communications lines for communicating information to, from, and/or between FGs (e.g., $F_1$ to $FG_n$), for example, at least a first digital bus line 102 and a second digital bus line 104. In one embodiment, first and second bus lines 102 and 104, respectively, are digitally linked to each other and configured to communicate via a digital communication line or digital data link 106 through their respective microprocessor. In an alternate embodiment, first and second bus lines 102 and 104, respectively, are not configured to digitally communicate through their respective microprocessor 110B as in $FG_n$. That is, microprocessors 110B of $FG_n$ are not linked and/or digitally connected to each other. First and second bus lines 102 and 104, respectively, are also digitally linked to each $F_1$ to $FG_n$, for example, via microprocessors 110A disposed within each $FG_1$ to $FG_n$.

First and second digital bus lines 102 and 104, respectively, include digital communication lines, channels, and/or links for providing two-way communications between components of system 100 via a communications protocol such as CAN A, CAN B, and/or ARINC429. Digital bus lines 102 and 104 are configured to communicate the same (i.e., identical and/or redundant) information to each FG (e.g., $FG_1$ to $FG_n$), thereby allowing for flexible data sharing and safety-critical, autonomous vibration control.

Each FG (e.g., $FG_1$ to $FG_n$) may include a rotary actuator, not limited to a CFG. CFGs are configured to generate circular forces upon co-rotation of imbalance masses (not shown) disposed therein. In an exemplary embodiment, $FG_1$ to $FG_n$ may each include a CFG configured to generate vibratory forces at one or more frequencies, as needed, to cancel the vibration associated with, for example, a main rotor of a rotary wing aircraft. System 100 may be implemented within any vibrating structure or system, not limited to the field of aircraft or avionics.

Each FG includes one or more mechanical and electrical components disposed within a housing or enclosure thereof. For example, $FG_1$ to $FG_n$ may each include at least one accelerometer 108, a plurality of microprocessors 110A, at least one motor 112, and at least one pulse width modulator (PWM) 114 circuit or component. In some embodiments, $FG_1$ to $FG_n$ can each receive electrical power via at least one power (PWR) input module 116. Electrical power may be transmitted to $FG_1$ to $FG_n$ via PWR module 116 or across the digital bus lines 102 and 104. Only one, or in some aspects, multiple PWR modules 116 (e.g., FIG. 2) are contemplated.

In some embodiments, electronic components of $FG_1$ to $FG_n$ are configured to receive information from sensors, for example, regarding vibration information, and then execute instructions stored within microprocessors 110A causing motor 112 to implement a speed, frequency, and phase position control needed to generate an appropriate force output via rotation of imbalance masses (not shown).

In some embodiments, system 100 includes a SCAVCS, as microprocessors 110A receive and process redundant information, such that in case a failure should occur at one FG, the information is not lost and/or can be easily shared or communicated to one or more of the other FGs. Thus, vibration control can be implemented or shared and/or offloaded to one or more of the remaining, active FGs to compensate for a failed FG. In addition to this, system 100 includes a flexible architecture in which a defective FG can be bypassed (e.g., via multiple bus lines 102, 104) and/or shut-down (e.g., via disabling power to that FG) where the force output generated by the defective FG is not a desired output, or where the FG erroneously induces unwanted vibration.

In some embodiments, $FG_1$ to $FG_n$ each include one or more accelerometers 108 (e.g., bi-axial or uniaxial) for measuring or detecting vibration, and supplying redundant vibration signals to each of the plurality of microprocessors 110A. Providing multiple microprocessors 110A at each FG reduces the risk of failure at the FG, as each microprocessor 110A is configured to individually generate and execute force commands (i.e., force command control signals) as needed, and act as a back-up should one microprocessor 110A fail. In some embodiments, at least one microprocessor 110A (e.g., a master microprocessor) is configured to instruct motor 112 to co-rotate masses at a determined speed, frequency, and/or phase for generating a vibration cancelling force according to a detected vibration. Should one microprocessor 110A fail, at least one other microprocessor 110A is digitally linked thereto and present within system 100 for implementing vibration control. In some embodiments, $FG_1$ to $FG_n$ each produce oscillatory forces for cancelling vibration.

In some embodiments, each microprocessor 110A operates and/or functions as a controller for the respective FG (e.g., $FG_1$ to $FG_n$), thereby obviating the need for a separate, centralized controller. In some embodiments, each microprocessor 110A operates independently of the other microprocessors 110A and each independent microprocessor 110A is electronic communication with each of the other microprocessors within the respective FG for improved robustness, autonomy, and redundancy.

Still referring to FIG. 1 and in some embodiments, each microprocessor 110A is configured to receive and/or monitor electronic communications or signals from at least one set of sensors 120, system devices transmitting system parameters 122 and/or additional inputs 124. First and second bus lines 102 and 104 are configured to transmit the same (i.e., redundant) information regarding sensors 120, system parameters 122, and/or inputs 124 so that information is recoverable should one communication line fail or become disabled during operation.

Microprocessors 110A and therefore, FGs (e.g., $FG_1$ to $FG_n$) are configured to share information using one or both bus lines 102 and 104 in the event of a failure. Each microprocessor 110A is configured to receive the same information, which may be communicated from different communication lines. That is, one microprocessor 110A receives information regarding sensors 120, parameters 112, and inputs 124 from first bus line 102, while the at least one other microprocessor 110A at each FG receives the same information from sensors 120, parameters 122, and inputs 124 from second bus 104. Information regarding sensors 120, parameters 112, and inputs are indicative of active conditions at or on the vibrating structure or system, and used to control vibration.

For example, a plurality of sensors may be provided to send vibration information to FGs. In some embodiments, "n" number of sensors (where "n" is a whole number integer>2) are provided per system 100. First and second bus lines 102 and 104, respectively, also convey a plurality (i.e., n) of system parameters 122 and a plurality (i.e., "n") of additional inputs 124. Sensors 120 may include any component suitable for detecting noise and/or vibration of a structure, or any portion thereof, and including and not limited to accelerometers, microphones, strain gauges, inertial motion systems, temperature sensors, force sensors, motion detectors, and any other device capable of measuring a physical condition associated with a vibrating structure or system. One or more types of sensors 120 may be used.

System parameters 122 represent any number of inputs that may also be communicated to or between components of system 100. For example and using an aircraft or helicopter platform as the non-limiting example, system parameters may include flight data (e.g., true airspeed, altitude), angle of attack, engine speed (tachometer or tach), rotor azimuth, rotor speed, weather conditions, landing conditions, or any other electronically available data from the aircraft or helicopter. One or more types of system parameters may be simultaneously provided to a plurality of different bus lines 102, 104 for intra-system 100 redundancy as well as to a plurality of different microprocessors 110A within FGs for intra-FG (e.g., $FG_1$ to $FG_n$) redundancy. System 100 includes multiple levels of redundancy, so that system 100 may re-configure as needed to maintain vibration control in the event of any component (e.g., bus lines, FG, etc.) failure.

Additional inputs 124 represent any number of inputs that may impact the performance of the vibrating system. Continuing with the non-limiting example of an aircraft or helicopter platform, additional inputs 124 may include the type of cargo, center of gravity loaded and unloaded, type of responsiveness of the platform (e.g., to unwanted vibration), or any other electronic information that may impact performance of system 100.

System 100 may implement active vibration control using computer hardware or software, and may also provide a safety architecture having redundancy in the data communication lines (e.g., conveying identical information simultaneously) as well as having redundancy within the actuators themselves (e.g., within $FG_1$ to $FG_n$). Where weight allows, a plurality of motors 112 may also be provided for further redundancy. Motors 12 are co-located at FGs (e.g., $FG_1$ to $FG_n$) for reducing the risk of excessive electromagnetic emissions and simplifying system wiring. This architecture also allows for some of the power electronics to be separated from the FGs (e.g., $FG_1$ to $FG_n$) for reducing weight. System 100 is configured to detect faults within the system, and/or components (e.g., $FG_1$ to $FG_n$) thereof, and either correct the problem or shutdown the defective component, as needed, to avoid a system shutdown. System 100 utilizes flexible data sharing to reconfigure communications, as needed, in case of faults, errors, failures, and/or data losses within a communication line. In some embodiments, $FG_1$ to $FG_n$ may be shut down by severing of power thereto, for example, using a shutdown switch or communication carried via data bus lines 102 or 104.

In some embodiments, each microprocessor 110A is configured to monitor at least one of the other microprocessors 110A, and in some embodiments each of the other microprocessors 110A, in addition to performing its intended function (e.g., generating/transmitting force commands to control FGs). In the event of a failure of one microprocessor 100 or FG (e.g., $FG_1$ to $FG_n$), the other active microprocessors 110A are able to compensate for the failure autonomously. This also provides safety-critical redundancy. In further embodiments, at least microprocessor 110A functions as a controller and the other(s) microprocessors 110A function as a monitor to monitor the health and effectiveness of vibration control provided by system 100. In this embodiment, if there is a failure in the controller microprocessor 110A, then the other monitoring microprocessor(s) 100 can act as a backup and take command of the FG having the failed microprocessor 110A for keeping it operable within system 100.

Utilizing microprocessor(s) 110A to monitor other microprocessors 110A can also include monitoring sensor information 120 and/or system parameters 122 for protecting the vibrating structure from receiving an erroneous force. Where system 100 is creating too much vibratory acceleration, force, strain, noise, temperature, etc., then the monitoring microprocessor 110A is configured to detect it and either shut down the defective FGs (e.g., via severing power) or adjusting the force to compensate for the defective FG. The monitoring microprocessor 100 can also detect internal faults within one or more FGs. Internal faults can include erroneous outputs including force magnitude(s), speed(s), or phase(s), or internal temperature of key components such as bearings, motors, and electronics. Internal faults can also include faults associated with CFG components (e.g., $FG_1$ to $FG_n$), power supplies, microprocessors, motor drive electronics, motor sensors, etc.

In some embodiments and as noted above, $FG_1$ to $FG_n$ may each also include multiple motors 112 for further mitigating the risk of failure, if weight constraints are met and/or can be maintained. Each microprocessor 110A is configured to receive information from one or more speed sensors disposed at each motor 112 for monitoring the speed of the motor and co-rotation of masses. PWM 114 includes a modulator device or circuit for controlling the width of the pulse and/or pulse duration provided to motor 112. PWM 114 a control for controlling power supplied to electrical devices, such as motor 112, for providing accurate active vibration control.

Figure 2:
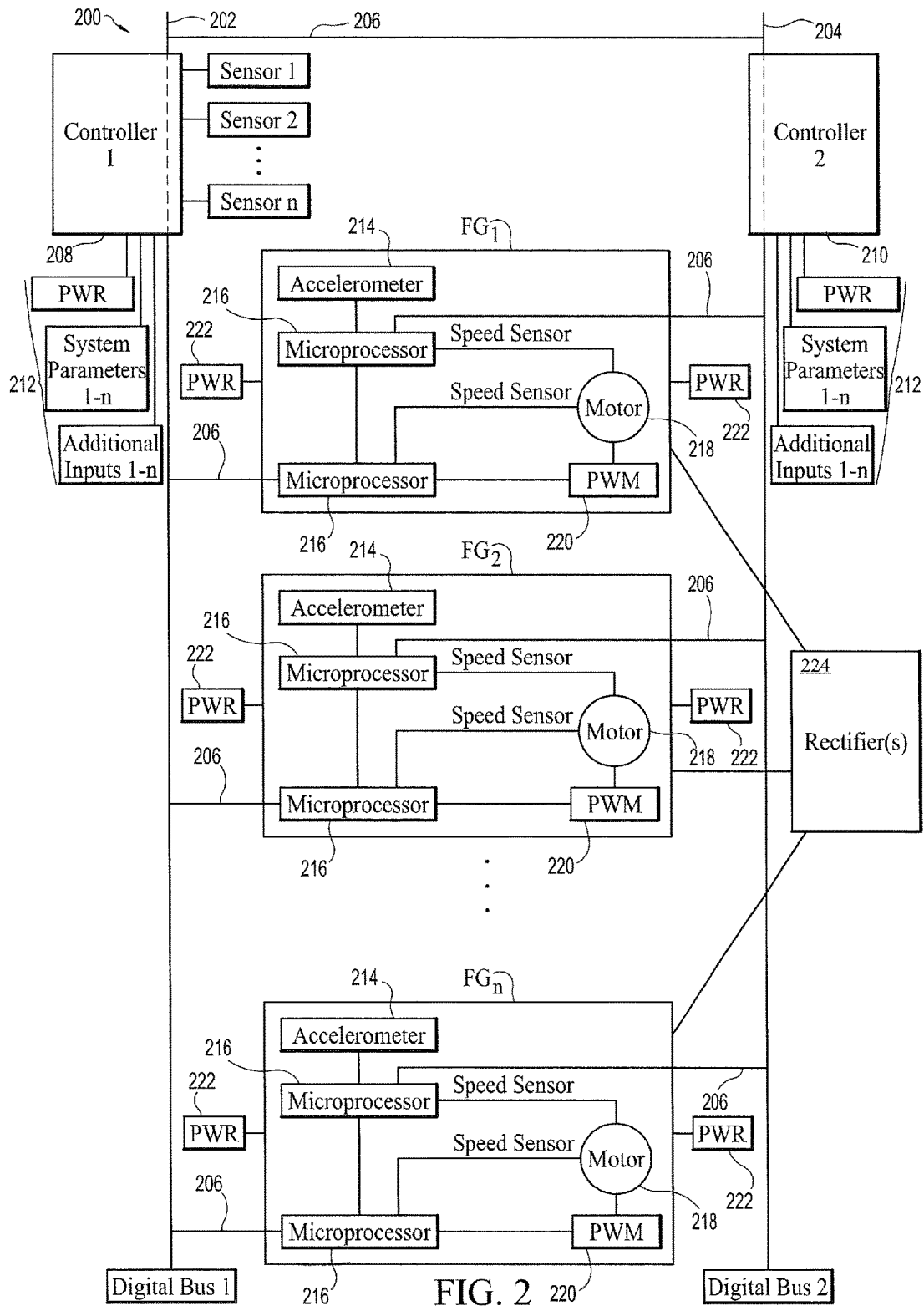
FIG. 2 is a schematic illustration of another embodiment of a redundant AVCS for controlling noise and vibration of a structure.

Referring now to FIG. 2, a schematic block diagram of a further embodiment of an AVCS, generally designated 200 is illustrated. System 200 includes a safety-critical, autonomous, and/or redundant system as it provides redundant and autonomous vibration control to a vibrating structure, system, or platform (e.g., aircraft, vehicles, structures, buildings, industrial machinery, etc.)

System 200 includes a plurality of digital communications lines for communicating information to, from, and/or between a plurality of FGs (e.g., $FG_1$ to $FG_n$), between for example, at least a first digital bus line 202 and a second digital bus line 204. First and second bus lines 202 and 204, respectively, are digitally linked to each other and configured to communicate via a digital communication line or digital data link 206.

As FIG. 2 illustrates, system 200 is similar in form and function to system 100, however, the microprocessors at each FG do not function as controllers. Instead, a plurality of separate controllers 208 and 210 are provided. Each controller 208 and 210 is associated a respective bus line 202 and/or 204, which provides redundant digital or electronic input to each FG (i.e., $FG_1$ to $FG_n$). A plurality of inputs 212 provides identical (i.e., redundant) information simultaneously to controllers 208 and 210. Inputs 212 include information from a plurality of sensors, various system parameters, and additional inputs (e.g., 1 through n, where "n" is a whole number integer greater than or equal to 2). Inputs 212 may include electrically communicated signals sent to and/or received by the separate controllers 208 and 210 directly through a wired or wireless connection, or indirectly across one or more digital bus lines 208 and 210.

Additional inputs 212 may receive electrical power from controllers 208 or 210, or directly from portions of the vibrating structure/system (e.g., aircraft, helicopter, system, platform, etc.). In some embodiments, individual power connections may be used in lieu of power from controllers and/or in addition to the power from controller 208, 210. This power architecture may also be applicable to FIG. 1.

Each controller 208, 210 may include a hardware processor and memory for executing instructions, algorithms, and/or processing data or information. Controllers 208, 210 also include a plurality of input and output communication interfaces for receiving input signals from a plurality of sensors and/or signals regarding parameters or additional inputs 212. Each controller 208, 210 may also determine vibration and noise levels, generate force cancelling control signals or commands, and output the force control signals or commands to vibration control devices, such as $FG_1$ to $FG_n$. $FG_1$ to $FG_n$ may receive and execute the control commands thereby actively and dynamically cancelling vibration and mitigating noise within a system, structure, or platform.

In some embodiments, bus lines 202 and 204 communicate redundant information including force control command signals from controllers 208, 210 to each FG, so that each FG may process the commands (e.g., via microprocessor 216) and generate a vibration cancelling force for cancelling unwanted vibration. System 200 utilizes a plurality of digital bus lines for communicating identical (i.e., redundant) information simultaneously thereby providing redundant, safety-critical active vibration control. $FG_1$ to $FG_n$ are configured to generate vibration cancelling forces until a desired level of vibration and/or noise is achieved.

Controllers 208 and 210 are lightweight, dimensionally compact, and include a low power design configured to receive and use approximately 28 volts-DC (VDC) from a power supply or power source. Each FG is also configured to receive approximately 28 VDC of power either from a power source directly or through controllers 208, 210. Each controller 208, 210 can receive up to fourteen (14) accelerometer 214 inputs and operate up to twelve (12) FGs (i.e., $FG_1$ to $FG_n$) or CFGs.

In some embodiments, separate electronics residing at each of $FG_1$ to $FG_n$ receive and distribute electrical power and communication information. Feedback accelerometers or sensors measure the vibration error at specific locations within the vibrating system (e.g., vehicle, aircraft, equipment, etc.) and communicate the information to controllers 208, 210. Electrical power may come from different aircraft busses and/or any number or power sources to further increase safety of system 100.

In some aspects, $FG_1$ to $FG_n$ are each configured to co-rotate a plurality of masses (not shown) driven by the at least one motor 218. Motors 218 can execute force commands generated at controllers 208, 210 and passed through microprocessors 216 at a speed and frequency specified the least one accelerometer 214 and plurality of speed sensors. For example, speed sensors monitor the speed of motor 218 and the one or more accelerometers 214 monitor the co-rotating masses with both providing input to microprocessors 216. In addition to the foregoing, $FG_1$ to $FG_n$ may each include PWM 220. In some embodiments, $FG_1$ to $FG_n$ each include CFGs configured to generate and/or induce vibration cancelling forces to the vibrating structure or system.

In some embodiments, each microprocessor 216 operates\independently of each of the other microprocessors, and is configured to control one or more FGs (e.g., $FG_1$ to $FG_n$), as needed. Each microprocessor receives all electronic communications from at least one set of sensors, accelerometers, and identical, simultaneous control commands from controllers 208 and 210. Each microprocessor 216 can monitor system inputs 212, parameters, sensors, controllers 208, 210, and/or FGs (i.e., $FG_1$ to $FG_n$) for ensuring adequate vibration control, and for reducing the effects of component/data communication failures. Microprocessors 216 can detect faults, errors, and/or failures in system 200 and/or components thereof.

In some embodiments, microprocessors 216 function or act as local controllers for the respective FG while receiving input commands from controllers 208 or 210. In some embodiments, $FG_1$ to $FG_n$ each include at least a first microprocessor 216 that receives input and/or force commands from one (e.g., a first) controller 208 and at least a second microprocessor 216 that receives input and/or force commands from the other controller 210. Any number of microprocessors 216 and/or controllers 208, 210 may be provided per system 200. Microprocessors 216 are also configured to monitor other microprocessor 216 and/or FGs, and provide redundant information to the controllers 208, 210 either together or individually. In some embodiments, microprocessors 216 are in electronic communication with digital bus lines 202, 204 and with controllers 208, 210 via data links 206.

In all embodiments, and as illustrated in FIG. 2, redundancy is provided. In one embodiment the redundancy is provided via microprocessors 216 within each FG (i.e., $FG_1$ to $FG_n$) where each microprocessor 216 is capable of functioning individually or in concert with other microprocessors 216 as a local FG controller, a networked controller interacting with all other microprocessors or controllers, a monitor of the FG, and/or as a monitor of inputs (e.g., sensors, system parameters, and/or additional inputs). In some embodiments, microprocessors 216 are configured to provide one of these redundancy elements or a combination of two or more of the redundancy elements. Additionally, each microprocessor 216 is capable of being subordinated to one or more external controllers 208, 210 in electronic communication with digital buses 202, 204. In some embodiments, system 200 redundancy allows one microprocessor 216 to assume control if another one fails, or if a controller 208, 210 should fail.

A plurality of rectifiers or rectifier electronics 224 is provided within system 200. Separated rectifier electronics are provided when the design envelope and the force requirement coupled with the need for a low weight system is present. Such a configuration improves electromagnetic emissions and simplifies system wiring. Rectifier electronics 224 converts 2-phase 115 VAC to 270 VAC for use by $FG_1$ to $FG_n$. In some embodiments, each rectifier electronic 224 can deliver power to at least four FGs, or more or less than four FGs, where desired.

Referring collectively to systems 100 and 200, multiple levels of redundancy are provided. For example, multiple microprocessors 216 provide redundancy by receiving and processing identical information/data, and can be used to provide control of system 200 should one or more of the controllers fail. In addition to this, redundancy is provided by the at least two digital bus lines 202, 204 and at least two controllers 208, 210. Controllers 208, 210 are configured to monitor overall system 200 performance and instruct FGs to produce vibration cancelling forces via microprocessors 216. System 200 includes a system architecture that is autonomous and reconfigurable for allowing the recovery of lost data, bypassing and/or shutting down of defective equipment (e.g., FGs), and allowing autonomous control using any of the multiple controllers 208, 210 and/or microprocessors 216. If one digital bus line 202, 204 fails, then the other is able to continue operations with little to no degradation in system 200 performance. Each digital bus line 202, 204 is in electronic communication with each controller 208, 210, FG (i.e., $FG_1$ to $FG_n$), and at least one microprocessor 216 residing at and/or within each FG.

In some embodiments, redundant active vibration control systems are safety-critical as redundancy ensures that the FGs (i.e., $FG_1$ to $FG_n$) responsible for cancelling or controlling vibration are operable approximately 100% of the time. By providing a plurality of autonomously controlled FGs and redundant communications thereto, safety is advantageously enhanced. For example, each of systems 100 and 200 ensure that if one FG fails, the controllers and/or microprocessors are able to command the remaining FGs to pick up, manage, and/or share the load previously carried by the now failed or defective (e.g., and/or bypassed) FG, and the impact of the single failure is minimized.

Returning to the earlier non-limiting example of an aircraft or helicopter, typical failure rates for aviation systems are captured in Table 1 below. These rates indicate the type of failure and the allowable failures per incident. For most aviation related situations the FAA identified allowable failure rate for a Class IV airplane for flight critical systems is found in FAA AC 23.1309-1E, dated November 2011. Table 1 represents the most stringent case for airplanes. The failures are defined by the FAA Table 1.

TABLE 1

| | |
|---|---|
| Minor | <1 in 1,000 Flight Hours |
| Major | <1 in 100,000 Flight Hours |
| Hazardous | <1 in 10,000,000 Flight Hours |
| Catastrophic | <1 in 10e9 Flight Hours |

To further increase the safety/reliability of systems 100 and 200 from "Minor" to a higher criticality level, additional redundancy may be added to each FG (i.e., $FG_1$ to $FG_n$). This could consist of and/or include redundant bearings, motors, motor controllers, and/or power supplies.

Systems 100 and 200 described herein can weigh approximately six (6) to 560 pounds, dependent upon the number of FGs, and the size (e.g., 12" diameter, etc.) of FGs provided per system.

Figure 3:
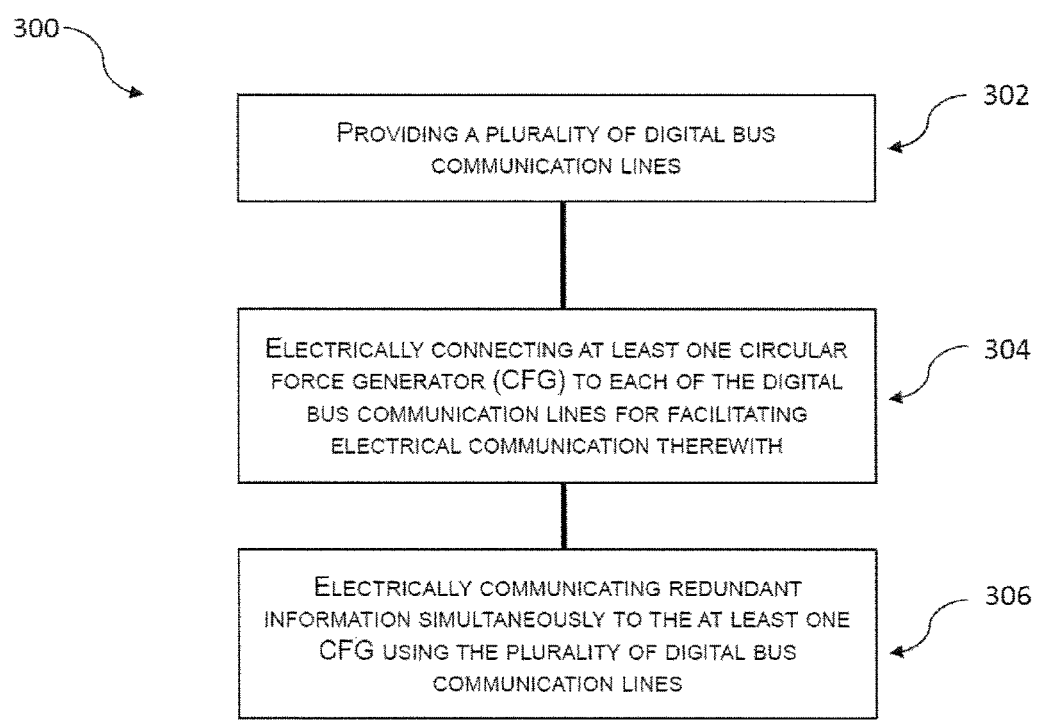
FIG. 3 is a block diagram of an exemplary method for providing redundant active vibration control.

FIG. 3 is a block diagram illustrating a method, generally designated 300 of providing a redundant AVCS. At block 302, the method includes providing a plurality of digital bus communication lines (e.g., 102, 104, 202, 204, FIGS. 1 and 2). In some aspects, the digital bus communication lines are lined together and include digital channels or links for providing two-way communications between components of a system via a communications protocol such as CAN A, CAN B, and/or ARINC429.

At block 304, at least one CFG is electrically connected to each of the digital bus communication lines for facilitating electrical communication therewith. At block 306, redundant information is electrically communicating simultaneously to the CFG, using the plurality of digital bus communication lines. In some embodiments, the redundant information is communicated to two or more microprocessors disposed in the CFG. The CFG can then process the redundant information and generate a force that substantially cancels an unwanted vibration force.

Figure 4:
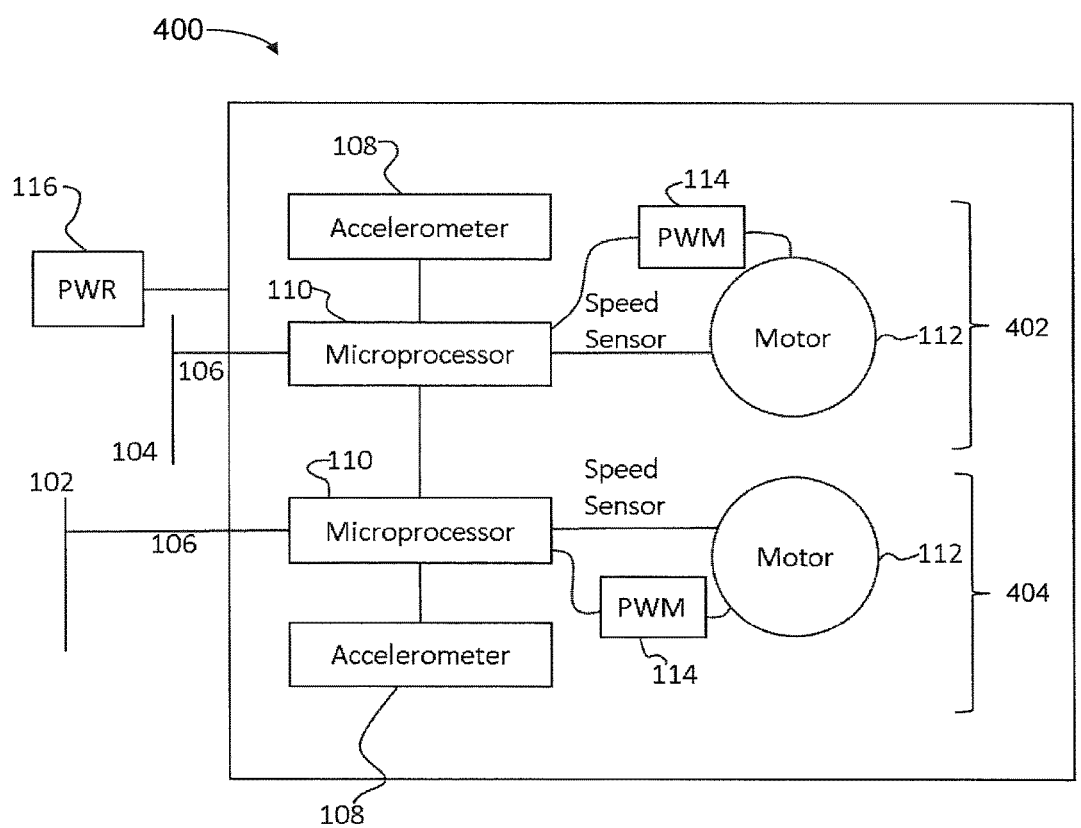
FIG. 4 is a schematic illustration of an embodiment of a redundantly configured force generator (FG) for use in a redundant AVCS as described herein.

FIG. 4 illustrates an embodiment of a redundant FG, generally designated 400, for use in a redundant AVCS (e.g., 100 or 200) as described herein. That is, systems 100 and 200 may be configured to incorporate FG 400 as an alternative to $FG_1$ to $FG_n$ (FIGS. 1 and 3). FG 400 is similar in form and function to $FG_1$ to $FG_n$ (FIGS. 1 and 2) however; FG 400 includes an additional level of redundancy. FG 400 is connected to first and second bus lines 102 and 104 via data links 106 as previously described. In addition to this, FG 400 includes at least a first set 402 and a second set (e.g., a redundant set) 404 of components. Each of first and second sets 402 and 404 may include an accelerometer 108, a microprocessor 110, a motor 112, and a PWM 114. Thus, if any component within first set 402 should fail, the remaining redundantly configured component in second set 404 may take over, and vice versa, for preventing failure of the overall FG 400 and/or respective AVCS (e.g., 100, 200) in which it is provided.

In some embodiments, FG 400 includes multiple microprocessors 110 configured to drive a respective motor 112 for rotating a single imbalance mass to create a force. If the respective accelerometer 108, speed sensor, PWM 114 and/ or motor 112 should fails on one microprocessor 112, then the remaining microprocessor 112 may take over. In some embodiments, FG 400 utilizes a motor 112 having redundant windings. The same microprocessor 112 may communicate with one or more motors 112 as illustrated in FIG. 4.

Redundancy is provided within each CFG via the plurality of microprocessors (and optionally redundant motors and PWM e.g., FIG. 4) and redundancy is also provided in the overall system via the plurality of digital bus communication lines and optional controllers, where microprocessors do not function as controllers.

Other embodiments of the current subject matter will be apparent to those skilled in the art from a consideration of this specification or practice of the subject matter disclosed herein. Thus, the foregoing specification is considered merely exemplary of the current subject matter with the true scope thereof being defined by the following claims.

What is claimed is:

1. An active vibration control system (AVCS), the system comprising:

at least two digital bus communication lines;
a plurality of sensors in electronic communication with each of the at least two digital bus communications lines;
at least two circular force generators (CFG), each of the at least two CFGs having at least one motor, at least two imbalance masses and at least two microprocessors therein, wherein each of the at least two microprocessors of each CFG is in electronic communication with each of the at least two digital bus communication lines and each of the at least two microprocessors of each CFG are in electronic communication with each of the plurality of sensors and the microprocessors of all the other CFGs, wherein the at least two CFGS are in a distributed architecture;
wherein at least a first microprocessor within each CFG is configured to process redundant information communicated from the at least two digital bus communication lines and the other microprocessors with the same CFG, and each of the microprocessors within each CFG monitor each of the other microprocessors within the same CFG for errors, faults, or failures in vibration control; and
wherein any one of the microprocessors in each CFG is configured to control the at least one motor thereby producing a force that substantially cancels an unwanted vibration force detected by the plurality of sensors.

2. The AVCS of claim 1, wherein the redundant information includes electronic signals indicative of vibration information, system parameters, additional inputs, information regarding the rotation of imbalance masses, or forces generated by each of the at least two CFGs.

3. The AVCS of claim 2, wherein the vibration information is obtained using one or more sensors and wherein the information regarding the rotation of imbalance masses is obtained using an accelerometer.

4. The AVCS of claim 3, wherein the sensors include accelerometers, microphones, strain gauges, inertial motion systems, temperature sensors, force sensors, or motion detectors.

5. The AVCS of claim 2, wherein the additional inputs include information regarding a type of cargo, a center of gravity, or a responsiveness of an unwanted vibration force.

6. The AVCS of claim 2, wherein the system parameters include any one of a true airspeed, an altitude, an angle of attack, an engine speed, a rotor azimuth, a rotor speed, weather conditions, or landing conditions.

7. The AVCS of claim 1, wherein the system is devoid of a centralized controller disposed outside of each of the at least two CFGs.

8. The AVCS of claim 1, wherein the system includes at least two controllers in electronic communication with at least some of the CFGs using at least one of the digital bus communication lines.

9. The AVCS of claim 8, wherein the redundant information includes a force control command signal generated by at least two controllers, wherein the at least two microprocessors are configured to provide local control of the CFG while receiving input commands from one of the at least two controllers.

10. The AVCS of claim 1, further comprising at least two motors disposed within each CFG, wherein each of the at least two microprocessors is configured to drive a respective motor.

11. The AVCS of claim 1, wherein the at least one of the at least two CFGs is configured to process the redundant information via at least one of the at least two plurality of microprocessors.

12. The AVCS of claim 11, further comprising more than two CFGs, and wherein at least one microprocessor residing within each of the CFGs is configured to monitor some or all of the microprocessors within the other CFGs for errors, faults, or failures of the system or components thereof.

13. The AVCS of claim 1, wherein the at least one CFG comprises at least two motors, where each motor is controllable by either a first microprocessor or a second microprocessor.

14. A method of providing a redundant active vibration control system (AVCS), the method comprising:
providing at least two of digital bus communication lines;
providing a plurality of sensors, wherein each of the plurality of sensors is in electronic communication with each of the at least two digital bus communications lines;
electronically connecting each of at least two circular force generators (CFG) to each of the digital bus communication lines for facilitating electronic communication therewith, wherein each of the at least two CFGs has at least one motor, at least two imbalance masses and at least two microprocessors therein, wherein each of the at least two microprocessors within each CFG is configured to receive and send communications from and to each of the at least two digital bus communications lines;
processing redundant information electronically communicated from each of the at least two digital bus communication lines in one of the at least two microprocessors within each CFG;
processing the same microprocessor receiving redundant information from each of the at least two digital bus communication lines redundant information communicated from the other microprocessors within the same CFG to the one microprocessor;
monitoring each of the at least two microprocessors, wherein each of the at least two microprocessors in each CFG monitor the other microprocessors within the same CFG for errors, faults, or failures in vibration control;
generating a force that substantially cancels an unwanted noise or vibration force detected by the plurality of sensors, wherein at least one of the microprocessors in each of the CFGs controls the at least one motor that generates the force.

15. The method of claim 14, wherein electronically communicating redundant information includes sending electronic signals indicative of vibration information, system parameters, additional inputs, or information regarding the rotation of an imbalance masses.

16. The method of claim 14, further comprising electronically connecting at least one controller to each of the at least two digital bus communication lines for instructing at least one of the microprocessors within each CFG.

17. The method of claim 14, wherein each CFG comprises at least two motors, and where each motor is controllable by either a first microprocessor or a second microprocessor.

* * * * *